United States Patent Office 3,434,843
Patented Mar. 25, 1969

3,434,843
STABLE FOOD PIECES
Jack R. Durst, Osseo, Minn., assignor to The Pillsbury Company, Minneapolis, Minn., a corporation of Delaware
No Drawing. Continuation-in-part of application Ser. No. 478,407, Aug. 9, 1965, which is a continuation-in-part of application Ser. No. 262,327, Mar. 4, 1963. This application Mar. 8, 1967, Ser. No. 621,473
Int. Cl. A23l *1/34*
U.S. Cl. 99—1                                    20 Claims

ABSTRACT OF THE DISCLOSURE

Compact food units designed to provide a completely balanced diet provided by incorporating essential nutrients into a unitary, flexible food piece containing a continuous external phase of a hydrophilic film former, water and an edible humectant. The external phase encapsulates an internal phase of minute fat globules. The food pieces are resistant to physical, chemical, and bacteriological degradation.

---

This application is a continuation-in-part of a prior application bearing the title, "Protective Coating," having Ser. No. 478,407, now Patent No. 3,323,922, filed Aug. 9, 1965, which is a continuation-in-part of a prior application bearing the same title having Ser. No. 262,327, filed Mar. 4, 1963, now abandoned.

This invention relates generally to unitary food pieces and more particularly to flexible food pieces of a unitary construction which are stable against degradation.

Heretofore, the need for providing a shelf stable, compact, nutritious food product for individuals such as campers, soldiers and spacetravelers and the like has long been recognized. Food products that contain the maximum nutritional value especially in respect to protein and caloric content without concomitant, unnecessary bulk and weight (i.e., the minimum volume to weight ratio) are deemed essential for such a utility.

Solely on a volume to weight basis, the edible fats are most suitable in providing the necessary caloric requirements in such a food product. However, from a physical, chemical and bacteriological stability viewpoint, the utilization of fats presents many problems which prevents the use thereof. A major problem with fats is its incompatibility with other solid food ingredients. Considerable difficulty has been encountered in preventing fat separation from the other solid constituents especially when the food products are subjected to abnormal conditions (e.g., temperature and humidity). Once separated from the other constituents, the fat readily degrades (e.g., oxidative degradation).

An additional requirement for such a food product is that it maintain its product identity until consumed. Palatability in respect to flavor, texture and the like should remain substantially unchanged notwithstanding exposure to abnormal conditions over prolonged periods of time. Also, it has been desired to provide a solid food product which contains a homogenous distribution of the caloric and proteinaceous requirements (preferably along with the other essential nutrients). Such a food product can be orally consumed in such a manner that a given amount of the product will provide ordinary and necessary nutritional food requirements for the consumer.

An object of the present invention is to provide food pieces which have an ability to withstand temperatures substantially in excess of body temperature for significant periods of time without deteriorating.

Another object of the present invention is to provide food pieces that are relatively stable against substantial changes in flexibility when subjected to changes in relative humidity.

An additional object of the invention is to provide flexible food pieces which contain the necessary nutrients to sustain life over prolonged periods of time.

According to the present invention there is provided a solid, flexible, water-dispersible, unitary food piece consisting essentially of an external phase and an internal phase, said external phase comprising a homogeneous dispersion of a hydrophilic film former, an edible humectant which has a boiling point and decomposition temperature in excess of 300° F. in an amount ranging from at least 1 part by weight to about 70 parts by weight humectant for each 10 parts by weight hydrophilic film former and water in an amount or at least 1 to about 30 parts by weight water for each 10 parts by weight hydrophilic film former, said internal phase comprising edible fat globules encapsulated by said external phase in an amount ranging from about 150 parts by weight fat to about 1 part by weight fat for each 10 parts by weight hydrophilic film former.

The food pieces of the present invention are characterized by flexibility, impact strength against shattering, lack of hygroscopicity and a low permeability to gases and moisture. The food pieces are stable against substantial reduction or increased flexibility when subjected to humidity variations of the surrounding atmosphere. At elevated temperatures (e.g., 300° F.) the food pieces will ultimately degrade by charring rather than separation of the internal phase from the external phase. Similarly, the food pieces are not deformed when subjected to elevated temperatures (e.g., 100° F. to 200° F.). Since the fat is totally encapsulated and protected by the external phase, the pieces are not subject to rancidification (e.g., oxidative degradation).

Examples of suitable edible film forming substances for the external phase include egg albumin, human serum albumin, sodium proteinate of soybean, wheat germ, gelatin, sodium caseinate, nonfat dry milk solids, whole egg, pea flour, bean flour, corn germ, gelatinized starch-carboxymethyl cellulose, agar agar, fish protein, gelsoy (soybean protein), whey, dextran, dextrins, bran protein, polyvinyl alcohol, polyvinyl-pyrrolidine, calcium alginate, potassium alginate, sodium alginate, carrageenan and salts thereof, hydroxypropyl cellulose, methyl cellulose, methyl ethyl cellulose, gum acacia, locust bean gum, gum ghatti, guar gum, gum karaya, oat gum, gum tragacanth, mixtures thereof and the like.

In addition to the edible film forming substances, the external phase contains water and an edible humectant. The edible humectants employable herein have an affinity for water and maintain a narrow range moisture content fluctuation when exposed to a wide and varied range of humidity. In general, the humectants adaptable herein exhibit either solid or liquid properties (i.e., non-gaseous) at temperatures in excess of 300° F. at 760 mm. pressure. Preferably, those humectants which are solid or liquid at 760 mm. pressure at 350° F. or above are employed. Suitable humectants which are normally liquid at room temperature but possess a difinitive boiling point are glycerine and propylene glycol. These normally liquid humectants provide a permanent plasticizing effect and are preferably employed herein as the humectant component. Other materials which exhibit humectant properties are those which in the dry form decompose at elevated temperatures rather than volatilizing. Suitable solid humectants include the dry solids of invert sugar-containing materials such as molasses, honey, brown sugar, papylon, fruit juices, starch hydrolyzates (e.g., corn syrup), sorghum, etc., as well as the aqueous solutions thereof and invest sugar itself. Other solid humectants include such edible materials as calcium chloride, fructose, maltose, sorbitol and the like. The amount of humectant contained in the external phase broadly ranges from at least one part by weight to about 70 parts by weight humectant for each 10 parts by weight hydrophilic film former.

In addition to the aforementioned film formers and humectants, the external phase contains water in an amount ranging from at least 1 part by weight to about 30 parts by weight water for each 10 parts by weight hydrophilic film former therein. A substantial portion of the water may be provided in the external phase by the employment of humectants such as honey, molasses, starch hydrolyzate syrups, cane juice, inverted fruit juices and the like. Advantageously, the amount of water and edible humectant to hydrophilic film former in the external phase respectively ranges from about 5 to about 15 and 3 to about 30 parts by weight for each 10 parts by weight hydrophilic film former.

The term "edible fat" as employed herein refers to both solid and liquid oils. The term "edible oil" refers to those edible fats which are normally liquid at room temperature. Examples of edible fats include lard, margarine base, margarine, a solid butter fat, butter oil, the hydrogenated and non-hydrogenated oils of cottonseed, corn, soy and safflower mixtures thereof and the like. The fat is provided in the instant food pieces as minute fat globules which are uniformly dispersed throughout the food pieces.

Depending upon the desired product, various other conventional food ingredients in varying amounts may be included in the present food pieces. Typical food in-agents includes preservatives, antioxidants, firming agents, texturizers, flavoring and coloring agents (e.g., see pages 65–258 and pages 49–53 of Chemicals Used in Food Processing, publication 1274 by the National Academy of Sciences, et al.).

In order to obtain the food product of the present invention, it is essential that a stable dispersion containing the fat, film formers, water and humectant be provided. Stability of the dispersion (i.e., a stable dispersion) can be readily ascertained by mixing a drop of the admixture in 100 ml. of hot water (130° F.) and then observing whether or not fat separation results. A stable dispersion will not release the fat (i.e., fat lakes will not appear at the water surface).

A suitable method of providing the food pieces of the present invention is to first admix the edible fat and edible hydrophilic film former with a sufficient amount of water and edible humectant at a temperature sufficient to melt the fat and for a period of time sufficient to provide a stable dispersion consisting essentially of an external phase of hydrophilic film former, water, humectant and an internal phase of an edible oil and then remove a sufficient amount of water to set the dispersion. When this method is employed, the fluidity of the stable dispersion is generally too great to provide the food piece in the ultimate desired form. Consequently, it is desirable to either refrigerate, to set the dispersion or place the dispersion in a mold and then dry the dispersion to permanently set it in the form of a food piece having the characteristics herein described.

Another method of providing the present food pieces is to admix the fat with a heat coagulable film former and a sufficient amount of water and edible humectant at a temperature sufficient to melt the fat but below the coagulation temperature of the film former for a period of time sufficient to provide a stable dispersion. The stable dispersion is then heated to a temperature and for a period of time sufficient to heat coagulate the film former. Suitable heat coagulable film former for this method include animal albumins such as egg albumin. After heat coagulation, the stable dispersion may then be cut into the desired size and shape and dried.

A further alternative method of providing the stable dispersion is to admix the hydrophilic film former with a sufficient amount of water and humectant and then aerate the admixture. Suitable gases for areation include edible gases such as air, nitrogen, carbon dioxide and the like. These gases are incorporated into viscous admixtures of hydrophilic film former, water and humectants in an amount sufficient to increase the volume of the admixture by at least about 100 percent (i.e., a two-fold increase) and generally greater than 200 percent (i.e., a three-fold increase). Suitable apparatuses for aeration include any high speed food mixer such as a Waring blender, a standard household mixer, a Hobart mixer, etc. Following aeration, edible fat is then slowly added to the aerated product while subjecting the product to high speed mixing in a manner such that the ingested gas voids are filled (i.e., the gas is displaced) with the fat without disrupting the continuous external water, humectant and hydrophilic film former phase. In order to incorporate the fat into the aerated product, it is essential that the fat be added thereto in a liquid state. High speed mixing conditions should be conducted in a manner such that the resultant added fat provides a stable dispersion. When fats which are normally solid at room temperature are employed, the aerated product and fat is maintained at a temperature greater than the melting point of the fat. Other food additives such as sugar, ungelatinized starch, coloring and flavoring agents, etc., may be admixed and uniformly distributed throughout the stable dispersion after formation of the stable dispersion. Advantageously, the stable dispersion containing other food additives is provided as an extrudable mass. By extruding the extrudable mass through a die orifice (preferably a non-adherent orifice such as a polytetrafluoroethylene orifice) and drying the extrudate (e.g., in an air dryer), the present food pieces can be produced in a continuous manner.

Drying the food pieces is conducted in a manner such that the resultant product has a moisture content of at least about 7 weight percent and generally less than about 20 weight percent. The preferred moisture level for the food pieces ranges from about 8 to about 15 percent by weight.

In a more limited aspect of the invention there are provided food pieces which contain a uniform distribution of proteinaceous and caloric food ingredients throughout the food piece. Based upon a food piece having a weight ranging from about 350 to about 1000 grams, such food pieces are adapted to provide at least 2800 kilocalories and at least 40 grams of protein containing the essential amino acids (i.e., the minimum daily adult male protein and caloric requirements). Advantageously provided are those food pieces that on a weight basis ranging from about 400 to about 800 grams and preferably less than 600 grams provide the minimum daily adult requirements in respect to protein and calories.

The prerequisite proteinaceous requirements may be provided by employing proteinaceous materials as the hydrophilic film former. Illustrative proteinaceous film formers for this purpose include egg albumin, hydrolyzed soy protein, corn germ, gelatin, sodium caseinate, nonfat dry milk solids, wheat germ, fish protein, bran protein, mixtures thereof and the like. If nonproteinaceous film formers (e.g., carboxymethyl cellulose, gelatinized starch, agar agar, dextran, polyvinyl alcohol, etc.) are primarily employed, the prerequisite proteinaceous requirements may be provided in the external phase by non-film forming food components such as torula yeast and denaturized egg albumin. Essential amino acids (e.g., arginine, cysteine (L-form), histidine (L and DL-forms), isoleucine (L and DL-forms), leucine (L and DL-forms), lysine (L and DL-forms), DL-methionine, phenylalanine (L and DL-forms), threonine, valine (L and DL-forms) and tryptophane (L and DL-forms) may be employed to provide the prerequisite protein requirements. Amino acid supplements such as alanine, aspartic acid, cystine, lysine monohydrochloride, proline, serine may also be incorporated in the food pieces.

A major portion or all of the prerequisite caloric requirements in the food pieces may be provided by the internal fat phase. Additional edible caloric ingredients such as torula yeast, dextran, gelatinized and ungelatinized starches (e.g., corn, high amylose corn, wheat, sago, potato, waxy maize, tapioca and rice starches), sugars or sugar bearing substances (e.g., sucrose, dextrose, lactose, maltose, corn syrup, honey, molasses, etc.), mixtures thereof and the like may be incorporated into the external phase.

Based upon about 350 grams to about 1000 gram weight basis, fully nutritional food pieces which provide the essential food nutrients including the protein and caloric requirements are also provided by the present invention. Essential food nutrients including vitamins such as ascorbic acid, biotin, niacin, as well as p-aminobenzoic acid, anhydrous betaine, betaine hydrochloride, carotene, citrus bioflavonoids, niacinamide, aluminum nicotinate, calcium and sodium pantothenate, d-pantothenyl alcohol, pyridoxine hydrochloride, riboflavin, thiamine hydrochloride thiamine mononitrate, vitamin A, vitamin A acetate, vitamin A palmitate, cyanocobalamin, calciferol, activated 7-dehydrocholesterol, riboflavin-5-phosphate, alpha tocopherol acetate can be provided as food constituents. Also, iodine compounds (e.g., iodine, cuprous iodide, potassium iodate and potassium iodide) may be provided therein. Other food piece constituents include the dietary and mineral nutrients such as boric acid, sodium borate, calcium carbonate, calcium citrate, calcium glycerophosphate, calcium oxide, calcium phosphate, calcium pyrophosphate, calcium sulfate, cobalt carbonate, cobalt gluconate, cupric chloride, cupric gluconate, cupric sulfate, cupric oxide, sodium fluoride, sodium silicofluoride, calcium fluoride, ferric choline citrate, ferric phosphate, ferric pyrophosphate, ferric sodium pyrophosphate, ferrous lactate, magnesium phosphate, magnesium sulfate, magnesium oxide, manganese citrate, manganese gluconate, manganese glycerophosphate, manganese hypophosphite, ammonium molybdate, molybdenum sisquioxide, molybdenum trioxide, zinc chloride, zinc gluconate, zinc oxide and zinc stearate. Advantageously provided herein are food pieces which on a weight basis ranging from about 400 grams to about 800 grams provide the essential nutritional requirements of an average adult male.

It is an essential embodiment of the present invention to provide a food piece in which the fat is stable against fat separation when subjected to the stable dispersion test hereinbefore described. To provide food pieces which are stable against fat separation, particular care to maintain the stable dispersion must be exercised throughout subsequent processing steps.

Food pieces which are comprised of a substantial amount of other food additives (other than the fats, hydrophilic film former and water and/or humectant) are best incorporated into the food piece by first providing the stable dispersion and then adding and admixing the other food additives for a period of time sufficient to homogenously disperse the other ingredients within the stable dispersion. A substantial quantity of these other food additives may be incorporated into the stable dispersion as a solid or solute. Since the stable dispersion is not adversely affected by the addition thereto of additional water and/or humectant, additional water and/or humectant can be employed to facilitate the incorporation of the other food additives within the stable dispersion. When food particles are provided in the external phase, advantageously, such food particles have a particle size of less than 250 microns and usually less than 150 microns.

The food pieces of the present invention can be provided in various sizes and shapes such as cubes, sheets, bars, rods, etc. The food pieces are of unitary construction in that any given portion of the food piece (e.g., 300 milligram portion) will have substantially the same uniform distribution of food constituents and nutritional value as another potrion thereof. In general, specific density of the instant food pieces is greater than 1.10 and most generally in the range of about 1.2 to about 1.4.

The following examples are illustrative of the invention:

EXAMPLE I.—FOOD RODS (A) Stable dispersion preparation

The following food ingredients in the designated amounts were employed in making a stable dispersion.

| Ingredients: | Parts by weight |
|---|---|
| Sucrose | 36.0 |
| Edible oil [1] | 15.2 |
| Dextrin | 13.0 |
| Corn syrup solids [2] | 10.5 |
| Sodium caseinate [3] | 8.3 |
| Glycerin | 7.0 |
| Gelatin (275 bloom) [4] | 4.8 |
| Cocoa | 4.5 |
| Vanilla | 0.5 |
| Citric acid | 0.1 |
| Potassium sorbate | 0.1 |

[1] Refined domestic vegetable oil having a Wiley melting point of 71° F.±3° F. and a solid fat index as follows: at 50° F. of 25–31 percent; at 60° F. of 7–13 percent; at 70° F. of 3 percent and 80° F. of 0.5 percent solids.
[2] Dextrose equivalent 26–30.
[3] Sodium caseinate having the following analysis:

| | Percent | | Percent |
|---|---|---|---|
| protein (N×6.38) | 90.0 | Leucine | 8.2 |
| Moisture | 3.5 | Lysine | 7.4 |
| Sodium | 1.5 | Methionine | 2.5 |
| Alanine | 2.6 | Phenylalanine | 4.4 |
| Arginine | 3.6 | Proline | 10.1 |
| Aspartic acid | 6.3 | Serine | 5.6 |
| Cystine | 0.3 | Threonine | 4.4 |
| Glycine | 2.4 | Tryptophan | 1.1 |
| Glutamic acid | 20.0 | Tyrosine | 5.6 |
| Histidine | 2.7 | Valine | 6.5 |
| Isoleucine | 5.4 | | |

[4] Bloom gelatin having the following analysis:

| | Percent | | Percent |
|---|---|---|---|
| Protein | 85.6 | Isoleucine | 1.75 |
| Moisture | 13.0 | Leucine | 3.25 |
| Alanine | 10.2 | Lysine | 4.55 |
| Arginine | 8.7 | Methionine | 0.85 |
| Aspartic acid | 6.8 | Phenylanine | 2.35 |
| Cystine | None | Proline | 15.55 |
| Glycine | 27.2 | Serine | 3.7 |
| Glutamic acid | 11.3 | Threonine | 2.2 |
| Histidine | 0.76 | Tryptophan | None |
| Hydroxylysine | 1.15 | Tyrosine | 0.6 |
| Hydroxyproline | 14.3 | Valine | 3.0 |

A stable dispersion was prepared by first heating the oil, in the amount designated until translucent (at about 150° F.). The oil was then placed into a Waring Blendor with the designated amount of sodium caseinate and sucrose. The resultant product was then blended at a low speed to form a uniform slurry (the sucrose and caseinate were coated with the oil). An aqueous portion was simultaneously prepared by adding the gelatin to 42 parts by weight cold water (about 60° F.). After allowing sufficient time for the gelatin to swell, the glycerin and citric acid were added thereto and the resultant aqueous portion was heated to 150° F. The resultant, heated aqueous portion was then rapidly poured into the blender containing the oil portion while maintaining vigorous agitation. The resultant aqueous and oil portions were then mixed in the Waring Blendor at a high speed for one minute. To insure a homogeneous mixture, the material sticking upon the inner wall of the Blendor was scraped into the mixed product and the Waring Blendor was operated for an additional two minutes at a high speed. The dispersions thus formed consisted of fine oil droplets (i.e., the internal phase) dispersed throughout the plasticized hydrophilic film former (i.e., the external phase). Stability of the dispersions thus formed was tested by mixing a drop of the dispersion in 100 ml. of hot water (130° F.). No separation of the oil portion from the dispersion was observed thus indicating that finite oil droplets were encapsulated within the water, glycerin and plasticized hydrophilic film former portion.

After formation of the stable dispersion, another 20 parts by weight cold water (at 60° F.) was added to the Waring Blendor and mixed therein at a low speed for two minutes. To the stable dispersion there was added in the designated amounts the remaining ingredients (i.e., cocoa, dextrine, vanilla and potassium sorbate). The remaining ingredients were uniformly mixed therein by operating the Blendor at a high speed for two minutes. The resultant product, a thick syrupy liquid, was then deaerated in a vacuum filter flask to remove any entrapped air.

(B) Preparation of food rods

The product from the above I(A) was formed into rods by forcing the product into polyethylene casings of a 0.35 inch diameter and 30 inch length. The casings were then heat sealed on each end and the product was refrigerated at 35° F. to 39° F. After one hour of refrigeration, the casings were removed from the product. The product which contained 38.2 percent by weight moisture was air dried, under ambient conditions (75° F. and 35 percent relative humidity) for three days, to a moisture level of 10 percent by weight.

(C) Rod characteristics

The dried rods from the above (B) possessed excellent chew, mouthfeel and flavor properties. The resultant flexible rods were of a uniform nutrient composition adapted to provide 9 grams of protein and 406 kilo calories for each 100 grams of product. Employing a standard test for stability of oils,* general glass rods, two inches in length, were coated with about a 1/20 inch layer of the stable dispersion prepared in accordance with I(A). The coated glass rods were placed in test tubes provided with a means of venting an air current thereover. The coated glass rods were maintained at 97.8° C. while subjecting to a heated air current. After eight days, the test was discontinued with no observable rancid odor, thus indicating the oils (i.e., internal phase) were protected from decomposition by the external phase. Under identical conditions, the food rods were stored for 477 hours (test then discontinued) with no detectable rancid odor. The flexible rods were stabilized against loss or moisture gain even when exposed to varied temperature and humidity conditions. Specific density of the rods was 1.2 grams per cubic centimeter.

EXAMPLE II (A) Preparation of stable dispersion

The following food ingredients in hereinafter designated amounts were employed in making a stable dispersion.

Ingredients: Parts by weight

Sucrose _____ 34.00
    Edible oil [1] _____ 15.70
    Dextrin _____ 14.90
    Corn syrup solids [2] _____ 10.52
    Dried egg albumen _____ 13.2
    Glycerin _____ 7.0
    Imitation raspberry flavor _____ 0.34
    Citric acid _____ 0.222
    Potassium sorbate _____ 0.1
    Gelatinized tapioca starch _____ 0.4

[1] Edible oil of type employed in Example I.
[2] Type employed in Example I.

*AOCS-CD-57.

The method of preparing the stable dispersion was identical with that of Example I(A) except that the mixing temperature was maintained at about 115° F. to prevent coagulation of the egg albumen.

(B) Preparation of food rods

The product from the above II(A) was forced into casings in a manner hereinbefore described in I(A). In lieu of refrigerating the encased product, it was heated and maintained at 150° F. for 60 minutes to heat coagulate the egg albumen. The casings were then removed and the product containing about 40 percent by weight moisture was air dried pursuant to the method of Example I(A). The resultant flexible rods exhibited properties similar to that characterized in Example I(C).

EXAMPLE III (A) Preparation of stable dispersion

A salami-flavored food rod was prepared from the following food ingredients.

Ingredients: Parts by weight

Dehydrated potato flakes _____ 28.6
    Corn syrup solids [1] _____ 28.5
    Edible oil [2] _____ 15.7
    Sodium caseinate [3] _____ 11.9
    Gelatinized tapioca starch _____ 5.0
    Glycerin _____ 3.5
    Salami-flavoring agent _____ 2.5
    Monosodium glutamate _____ 2.0
    Table salt _____ 1.4
    Garlic powder _____ 0.2
    Onion powder _____ 0.2
    Potassium sorbate _____ 0.1
    Citric acid _____ 0.1
    Red coloring agent _____ 0.3
        (2.5 percent aqueous solution)

[1] Type employed in Example I(A).
[2] Type employed in Example I(A).
[3] Type employed in Example I(A).

Into a Waring Blendor, 25 parts by weight water, the glycerin, the potassium sorbate and 9 parts by weight of the sodium caseinate were added and aerated at a high speed for two minutes (volume increased 200 percent). Red coloring agent was then added to the aerated product. Hot edible oil (at 120° F.) was slowly added to the aerated product while operating the Blendor at a high speed. After 90 seconds, all of the oil was dispersed therein, however, the Blendor was operated for an additional two minutes. When subjected to the stable dispersion test hereinbefore described, there was no observable fat separation from the resultant product. The resultant stable dispersion having a temperature of 115° F. was then transferred to a 2½ gallon stainless steel "Read mixer" equipped with a variable speed controller, thermal jacket, sigma blades and vacuum controller. The remaining ingredients including the remaining 2.9 parts by weight sodium caseinate were added to the "Read mixer" and the entire formulation was mixed for two minutes at 180 r.p.m. The resultant product was then extruded at 96° F. through a ⅜ inch diameter circular polytetrafluoroethylene die orifice with a mechanical press supplying the extrusion pressure. The extrudate containing 20 percent by weight water was air dried at about 75° F. and 35 percent relative humidity to a moisture level of 13.6 percent. The resultant rods possessed properties similar to that described in Example I, however, possessed an enhanced chew and texture character. The specific density of the rods was 1.325 grams per cubic centimeter. The rods had flavor and texture similar to salami.

EXAMPLE IV

An imitation cherry-flavored flexible rod from the following food ingredients was prepared.

| Ingredients: | Parts by weight |
|---|---|
| Sodium caseinate | 8.3 |
| Gelatin (275 bloom) | 4.8 |
| Edible oil [1] | 15.7 |
| Powdered sucrose | 38.1 |
| Glycerin | 7.0 |
| Citric acid | 0.22 |
| Potassium sorbate | 0.12 |
| Dextrin | 15.0 |
| Corn starch | 10.404 |
| FD&C red #2 | 0.016 |
| Cherry flavoring agent | 0.34 |
| Water | 12.36 |

[1] Similar to that of Example I(A).

The rods were prepared in a manner similar to that disclosed in Example III except that the "Read mixer" thermal jacket was maintained at 150° F., mixing was for 3 minutes at 170 r.p.m. and a vacuum of 24 inches gauge pressure. The resultant product having 12.36 percent by weight water was extruded at 130° F. upon a polytetrafluoroethylene coated conveyor belt and then air dried at 72° F. and a 35 percent relative humidity to a moisture level of 10.5 percent by weight (about 24 hours). It was observed that the product was easily extruded through the die orifice. The dried extrudate was resistant against impact shattering and flexible with an excellent flavor and eating character. The dried extrudate exhibited stability against a loss or gain of moisture when subjected to varying humid conditions (i.e., the product had a stable moisture level). The extrudate was stable against physical, chemical and bacteriological degradation.

EXAMPLE V.—PINEAPPLE-FLAVORED RODS

Nutritious food pieces containing the following food constituents were prepared.

| Ingredients: | Parts by weight |
|---|---|
| Sodium caseinate | 11.9 |
| Edible oil [1] | 15.7 |
| Powdered sugar | 39.79 |
| Glycerin | 7.0 |
| Citric acid | 0.22 |
| Potassium sorbate | 0.10 |
| Dextrin | 15.0 |
| Nongelatinized corn starch | 10.0 |
| Pineapple-flavoring agent | 0.18 |
| Yellow coloring agent (FD&C yellow, 4 percent solution) | 0.11 |
| Water | 12.5 |

[1] Similar to that of Example I(A).

The water, sodium caseinate, glycerin and potassium sorbate was aerated in a manner similar to that of Example IV. The stable dispersion was provided by admixing the edible oil along with the pineapple flavoring agent and color additives in a manner similar to that of Example IV. The remaining ingredients were then incorporated into the stable dispersion via the "Read mixer" at 150° F., 170 r.p.m., 25" mercury pressure thus providing a stable dispersion in a homogeneous paste-like form. Extrusion of the stable dispersion was at 126° F. through a ½ inch polytetrafluoroethylene die. The resultant dried extrudate possessed properties similar to that of the hereinbefore described dried extrudates. The rods were calibrated with physical impressions to indicate the amount of food rod consumption necessary to supply a balanced meal in respect to protein and caloric requirements for an average adult male.

Additional examples pursuant to the present invention may be found in Technical Report FD-29 entitled Food Adjuncts Stabilized as Thin Sheets or Laminates by Jack R. Durst and published by U.S. Army Natick Laboratories which is incorporated herein by reference.

What is claimed is:

1. A solid, flexible, water-dispersible food piece having impact strength against shattering and of unitary construction in that any given 300 milligram portions thereof will have substantially the same uniform distribution of food constituents as another portion thereof, said food piece consisting essentially of an external phase and an internal phase, said external phase comprising a homogeneous dispersion of a hydrophilic film former, an edible humectant which has a boiling point and decomposition temperature in excess of 300° F. in an amount ranging from at least 1 part by weight to about 70 parts by weight humectant for each 10 parts by weight hydrophilic film former and water in an amount of at least 1 to about 30 parts by weight water for each 10 parts by weight hydrophilic film former, said internal phase comprising edible minute fat globules uniformly dispersed throughout the food piece and encapsulated by said external phase in an amount ranging from about 150 parts by weight fat to about 1 part by weight fat for each 10 parts by weight hydrophilic film former.

2. The food piece according to claim 1 wherein the amount of water ranges from about 5 to about 15 parts by weight water for each 10 parts by weight hydrophilic film former.

3. The food piece according to claim 1 wherein from about 350 to about 1000 grams of the food piece provides at least 40 grams of protein and at least 2800 kilo calories.

4. The food piece according to claim 3 wherein the amount of humectant ranges from about 1 to about 35 parts by weight humectant for each 10 parts by weight hydrophilic film former.

5. The food piece according to claim 4 wherein the food piece has a moisture content of at least about 7 percent by weight but less than 20 weight percent water.

6. The food piece according to claim 5 wherein the food piece contains glycerin in an amount ranging from about 3 to about 30 parts by weight glycerin for each 10 parts by weight hydrophilic film former.

7. The food piece according to claim 6 wherein the amount of fat ranges from about 10 to about 60 parts by weight fat for each 10 parts by weight hydrophilic film former.

8. The food piece according to claim 7 wherein the food piece has a moisture content ranging from about 8 to about 15 weight percent water.

9. The food piece according to claim 8 wherein the hydrophilic film former is at least 1 member selected from the group consisting of sodium caseinate, egg albumin, gelatin, sodium proteinate of soy protein and nonfat milk solids.

10. The food piece according to claim 9 wherein the amount of humectant ranges from about 5 to about 20 weight percent glycerin for each 10 parts by weight hydrophilic film former.

11. The food piece according to claim 8 wherein from about 400 to about 800 grams of the food piece provides at least 40 grams of protein containing the essential amino acids and 2800 kilo calories.

12. The food piece according to claim 11 wherein less than 600 grams of the food piece provides at least 40 grams of protein containing the essential amino acids and 2800 kilo calories and the specific density is greater than 1.1 grams per cubic centimeter.

13. The food piece according to claim 12 wherein the specific density ranges from about 1.2 to about 1.4 grams per cubic centimeter.

14. The method of preparing solid, flexible, water-dispersible food pieces having impact strength against shattering and of unitary construction in that any given 300 milligram portions thereof will have substantially the same uniform distribution of food constituents as another portion thereof, said method comprising the steps of:

(a) providing a stable dispersion consisting essentially of an external phase and internal phase, said external phase consisting essentially of a homogeneous continuous dispersion of 10 parts by weight a hydrophilic film former, at least 1 part by weight to 70 parts by weight of an edible humectant and water, said internal phase comprising edible fat globules uniformly dispersed throughout said stable dispersion and encapsulated by said external phase in an amount ranging from about 150 parts by weight to about 1 part by weight fat for each 10 parts by weight hydrophilic film former; and (b) equilibrating the moisture level of said stable dispersion to provide a food piece having a moisture content ranging from at least about 7 weight percent to about 20 weight percent water and thus providing a solid, flexible food piece having impact strength against shattering.

15. The method according to claim 14 wherein the stable dispersion is provided by:

(a) providing an admixture by admixing the hydrophilic film former with water and at least one member selected from the group consisting of propylene glycol and glycerin;

(b) increasing the volume of said admixture by at least 100 percent by aerating and vigorously agitating said mixture; and (c) slowly adding an edible fat in a melted state to said admixture and agitating said admixture to disperse the ingested gas in said admixture with the melted fat to provide a stable dispersion consisting essentially of a continuous external phase comprising the hydrophilic film former, water and at least one member selected from the group consisting of propylene glycol and glycerin and an internal phase comprised of fat globules.

16. The method according to claim 15 wherein the admixture contains from about 5 to about 25 parts by weight water and from about 3 to about 30 parts by weight glycerin.

17. The method according to claim 16 wherein the edible fat is an oil and said oil is added to said admixture in an amount ranging from about 10 to about 60 parts by weight for each 10 parts by weight hydrophilic film former.

18. The method according to claim 17 which includes the additional step of establishing a moving mass of an extrudable stable dispersion in a zone terminated by a die orifice and extruding said mass through said orifice.

19. The method according to claim 18 which includes an additional step of equilibrating the moisture level of said extruded mass to provide a food piece having a moisture content ranging from about 8 to about 15 percent by weight water.

20. The method according to claim 14 wherein the hydrophilic film former is at least one member selected from the group consisting of egg albumin, sodium caseinate, gelatin, nonfat milk solids, lacto albumin and the soy proteinate of soy protein.

References Cited

UNITED STATES PATENTS

| 2,738,277 | 3/1956 | Cryns | 99—83 |
| 3,265,630 | 8/1966 | Jensen | 167—83 |

A. LOUIS MONACELL, *Primary Examiner.*

J. M. HUNTER, *Assistant Examiner.*

U.S. Cl. X.R.

99—166; 106—135, 143, 243